United States Patent [19]

Champenois

[11] 4,042,365
[45] Aug. 16, 1977

[54] CONVEYOR INSTALLATION FOR THE TREATMENT AND TRANSPORT OF GLASS ARTICLES

[75] Inventor: Paul Champenois, Guignicourt, France

[73] Assignee: Verreries Mecaniques Champenoises, Reims, France

[21] Appl. No.: 667,979

[22] Filed: Mar. 18, 1976

[30] Foreign Application Priority Data

Dec. 19, 1975 France .................................. 75.39083

[51] Int. Cl.² ............................................. C03B 29/04
[52] U.S. Cl. ........................................ 65/260; 65/118; 65/284
[58] Field of Search ................. 65/118, 119, 120, 227, 65/260, 284

[56] References Cited
U.S. PATENT DOCUMENTS 1,935,739   11/1933   Freese ................................. 65/260 X
3,290,135   12/1966   Jurich ................................. 65/118 X

Primary Examiner—Arthur D. Kellogg
Attorney, Agent, or Firm—Parmelee, Miller, Welsh & Kratz

[57] ABSTRACT

An installation for the flame treatment of glass articles comprises a succession of rotatable turntables driven linearly and cyclically by a chain between a loading point, at which a supply means, comprising a moulding press provided with a rotatable plate, the movement of which is synchronized with that of the chain, loads articles onto the turntables and an unloading point, passing through a flame treatment zone; and means to transfer an article from the rotatable plate to the turntables of the chain by means of at least one intermediate point, one article being transported from the transfer point to the chain, while the following article is transported from the plate to the intermediate point.

The installation may be used in the flame treatment of all glass articles.

10 Claims, 9 Drawing Figures

CONVEYOR INSTALLATION FOR THE TREATMENT AND TRANSPORT OF GLASS ARTICLES

BACKGROUND OF THE INVENTION

1. Field of the Invention

The present invention relates to the treatment and transport of articles made of glass, crystal or similar material and in particular to the flame treatment of glass tumblers of which the general shape is cylindrical, conical, prismatic or similar.

2. Description of the Prior Art

In the manufacturing technology of glass articles of this kind, it is conventional to form the articles by molding in a press a measured portion of molten glass ("gob"), then to subject each article to a flame treatment, i.e. the superficial remelting of the edges of the articles to eliminate the ridges and irregularities which inevitably arise in molding.

After a flame treatment of this kind, the articles are generally sent to an annealing furnace, then optionally to other finishing operations. Traditionally, glass objects are molded in a press, in rotating assemblies comprising a certain number of molds regularly spaced around their periphery. Thus there are for example "single gob" molding installations in which twelve molds are regularly spaced around the periphery of a revolving plate which receive successively and cyclically a gob of molten glass at a fixed point on the peripheral travel of the plate, and the molded article is discharged from them at another point along this travel. Molding presses (double gob) are also known in which two of the molds of the rotating assembly are charged at the same time, which, all other things being equal, doubles the rate of production.

After the molding operation, briefly described above, comes the flame treatment operation. Generally, the articles coming from the press are transferred to a chain where the articles are placed on rotating supports or "turntables" which are driven in a linear direction by the chain. During the flame treatment process, the edge of the articles is remelted by a series of burners arranged in linear fashion along the chain forming a substantially continuous flame into which the turntables, turning on their axes, bring the edges of the articles.

After flame treatment, the articles are transferred to a transporter which takes them to the annealing furnace and optionally to other finishing operations, such as decoration.

Thus a flame treatment installation conventionally comprises a set of rotating supports or "turntables" driven linearly and cyclically by a chain between a loading point, where supply means load articles onto the turntables, and an unloading point where unloading means remove the articles, passing through a flame treatment zone in which the edges of the articles come into contact with the flames of a series of burners.

In the following, to simplify the description, such installations will be referred to as a flame treatment installation of the above mentioned type.

The flame treatment installations known hitherto have numerous disadvantages, both as regards their supply, i.e. the transfer of the articles from the press to the chain, and as regards the strict control of flame treatment times and travel, for which the edges of the articles are in the burner flame, and also as regards monitoring the orientation of the articles, in particular when they are transferred from the flame treatment chain for subsequent operations.

SUMMARY OF THE INVENTION

The invention proposes a flame treatment installation which eliminates all these disadvantages.

One of the objects of the invention is to provide a flame treatment installation of the above mentioned type in which the supply means comprises means for the transfer of an article from a mold to an intermediate point and from the intermediate point to the turntable chain. The inclusion of an intermediate point permits an increase in the speeds of transfer of the articles from the press to the chain. The intermediate point is advantageously used for cooling the articles as they leave the mold.

Another object of the invention is to provide a flame treatment installation which can be supplied from a molding press of the above mentioned "double gob" type. In this case, the means of transfer are divided and comprise on the one hand means for the transfer of the article from a mold to a fixed intermediate point and from the fixed intermediate point to the softening chain, and on the other hand means for the transfer of an article from a mold to a fixed intermediate point then from this point to a rotary swivel and in addition from the swivel to the softening chain.

Another object of the invention is to provide a flame treatment installation of the above mentioned type in which rotating supports or turntables move linearly and cyclically, incorporating means for the orientation and controlling of the orientation of the turntables from one end to the other of their travel between the loading point and the unloading point. In this way, the articles placed on the turntables by the transfer means with a predetermined orientation maintain a controlled orientation during the entire transport process and are finally unloaded at the unloading point with a predetermined orientation.

Another object of the invention is to provide an installation of the above mentioned type in which means are provided for the regulation of the speed of rotation of turntables when the edge of the articles is brought into contact with the flames of a set of burners, in the flame treatment zone.

Other objects, characteristics and advantages of the present invention will appear in the course of following description which with reference to the accompanying drawings describing the preferred embodiments of the invention.

DESCRIPTION OF THE PREFERRED EMBODIMENTS

Figure 1:
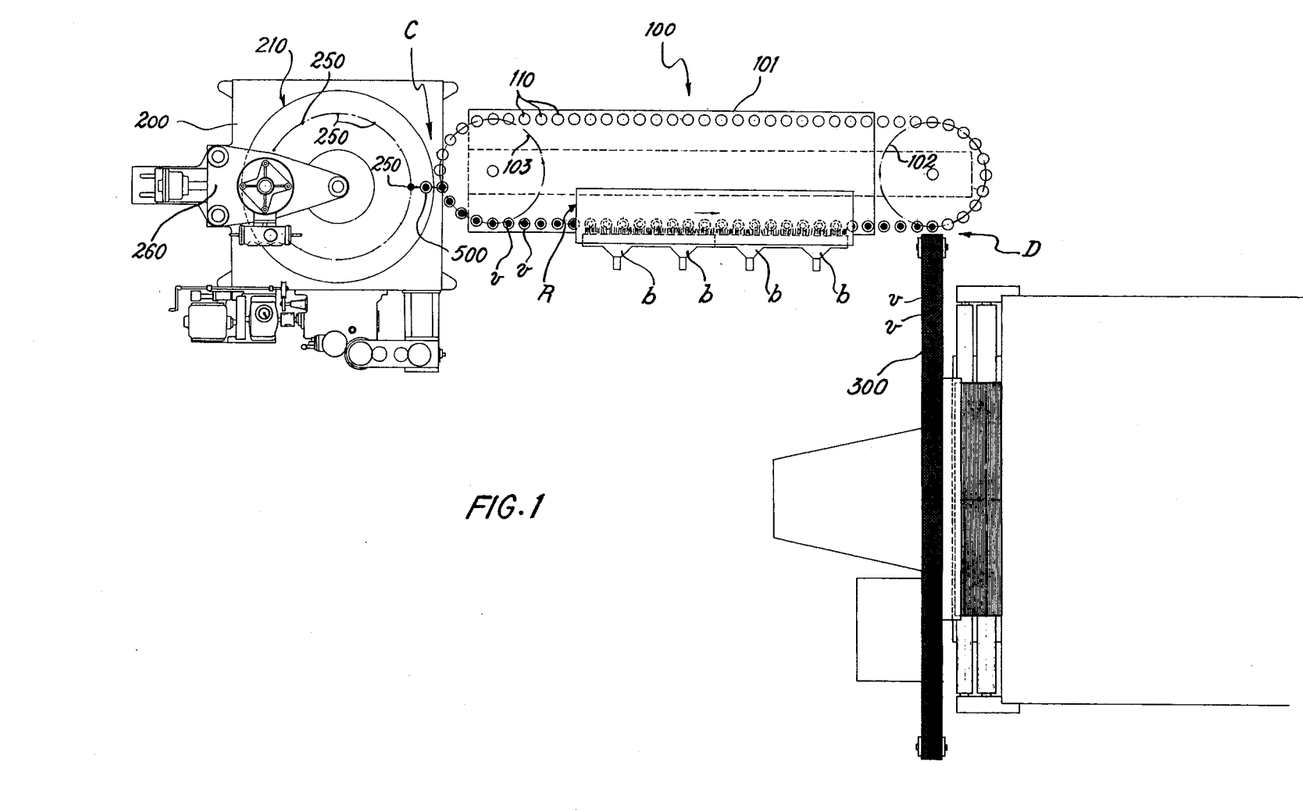
FIG. 1 represents a schematic plan view of a flame treatment installation according to the invention.

A plan view of an installation according to the invention is shown schematically in FIG. 1.

It comprises essentially a chain 100 mounted on a frame 101 and mounted between two sprocket wheels 102 and 103 of which one is driven and the other free. The chain 101 comprises a plurality of rotating supports or "turntables" 110 mounted on shafts 111 which are capable of revolving about their own axes. The turntables 110, driven by the chain, circulate between a loading point C and an unloading point D, passing through a flame treatment zone between them.

At the loading point C each turntable receives a glass article v from a molding assembly 200.

The assembly 200 comprises a rotating plate 210 on which there is mounted a series of molds M at locations which are referenced 250 on FIG. 1. In the example shown in FIG. 1 there are twelve mold positions 250 and twelve molds. A device 260 arranged opposite the loading point C introduces successively one "gob" of molten glass into each of the molds which pass successively below it. The rotating plate 210 moves by twelfths of a revolution. When a mold such as M (FIGS. 2 and 3) comes opposite the loading point C, the glass article v formed in it is brought into a high position ready to be transferred onto a turntable 110 of the chain 100, which is contiguous with the molding assembly 200.

Such a molding assembly has not been completely described but it is of the conventional type used in the manufacture of glass articles (single gob press).

Opposite the unloading point D and at right angles to the arrival of the chain at the point D there are located unloading means, which in the examples shown comprise a conveyor 300 to transport the articles v away for subsequent treatment (annealing and other finishing processes).

In the flame treatment zone R, in a manner which is in itself known, the turntables 110 are set in rotation, carrying with them the articles v and the edges of the articles are presented to the flames of a set of burners b, preferably natural gas burners.

Having this briefly described the essential structure of any flame treatment installation, the specific characteristics of the invention are described below.

Figure 2:
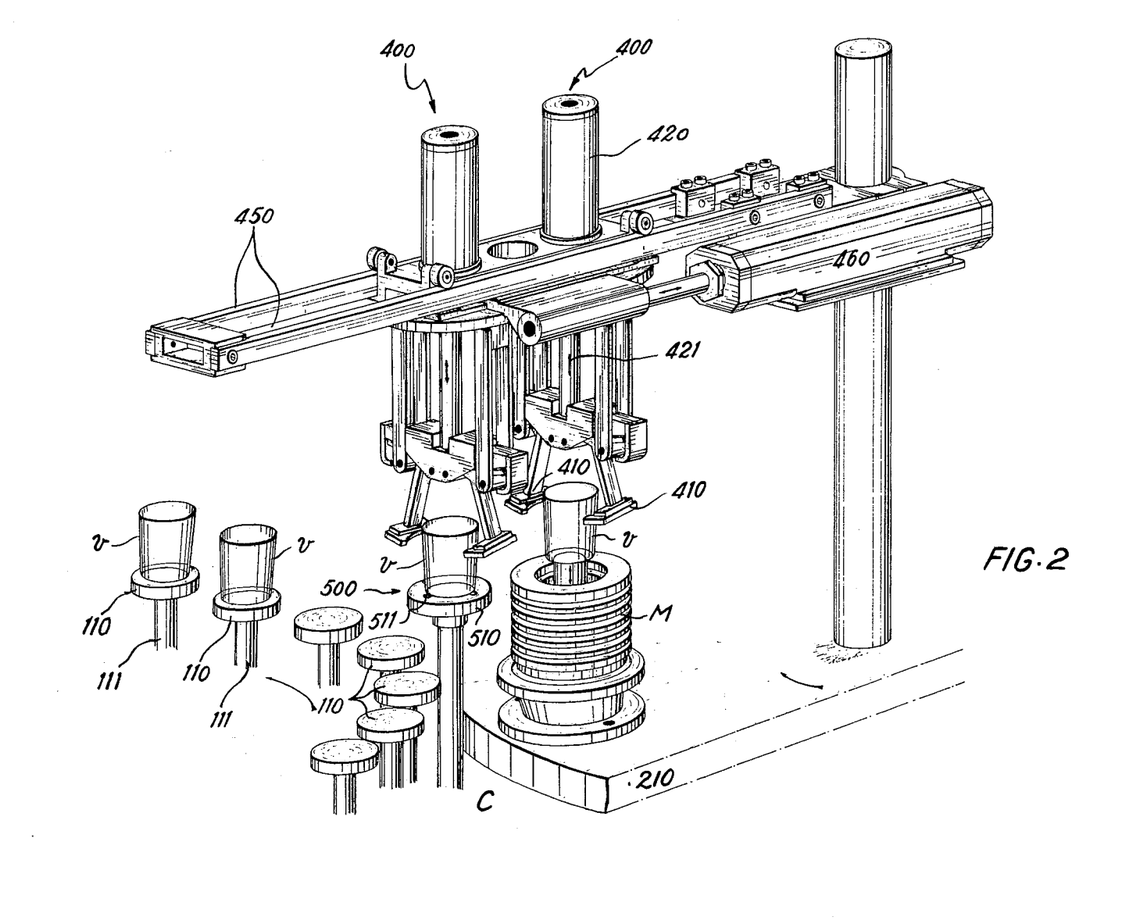
FIGS. 2 and 3 represent a perspective view of a double gripping assembly for transferring the articles to a chain.
Figure 3:
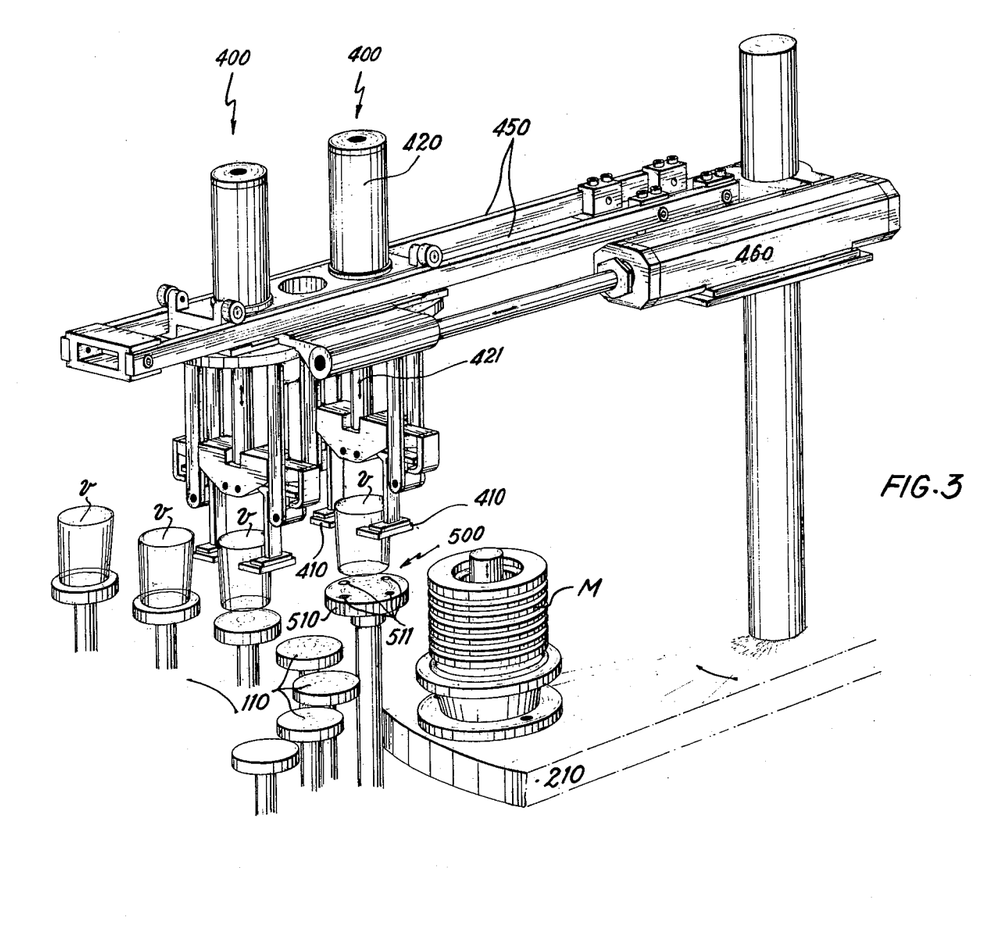

First of all, with reference to FIGS. 2 and 3, the specific means for supplying the chain of turntables at the loading point C will be described.

These means comprise a system having two gripping assemblies 400, capable of sliding on the radial guides 450 under the action of a hydraulic or pneumatic ram 460.

Each gripping assembly 400 comprises two opposed jaws 410 articulated so as to be moved towards or away from one another under the effect of a hydraulic or pneumatic control ram 420, of which the vertical rod 421 controls the distance between the jaws by means of a mechanical transmission system. Such a gripping and transmission system is in itself conventional for glass articles and does not need to be described in detail.

A remarkable feature of the present invention is in the provision of a system using two gripping assemblies 400 to transfer a glass article v from the mold M to the turntable 110 as it appears at the point C.

To do this a fixed intermediate point 500 is used comprising essentially a horizontal support 510 substantially at the level of the turntables 110.

The movement of the chain of the turntables 110 and the rotational movement of the plate 210 are suitably synchronised by mechanical or electrical means in such a way that the mold M and one turntable 110 are simultaneously present on either side of the support 510 when the gripping devices are applied.

In a preferred example, synchronisation can be effected in the following way: the plate 210 is provided with a metal part. A fixed detector detects the passage of this metal part and represents it by an impulse; similarly, the circulation of the turntable chain can be detected and indicated by impulses. As the two movements are therefore associated with impulses, it is possible to indicate by electrical or electromechanical means the synchronism (satisfactor relative regulation) or otherwise of the plate 210 and the chain, so as to control in the event of non-synchronism, a compensating action, for example a variation in the speed of the chain by means of a variable transmission.

The transfer operation takes place as follows: from the initial position (FIG. 2), for which an article v is present in the upper part of the mold M and an article v present on the plate 510, the two jaw assemblies 410 simultaneously grip these two articles lifting them lightly from their respective supports. Under the action of the ram 460, the two assemblies 400 advance on the guides 450. In their advanced position, they release the articles which then rest on a turntable 110 for the article which has come from the support 510, and on the support 510 for the article which has come from the mold M. The ram 460 then brings the gripping systems back on the guides 450 and the cycle can begin again. In any event it will be easily understood that the transfer of an article from the mold to the turntable chain is effected via the fixed point 500, all the articles resting temporarily on the support 510 during this transfer. Such an arrangement is advantageous in the sense that it permits the achievement of high rates of working; if the article were transferred directly from the mold to the turntable, the travel of the gripping assemblies 400 would be twice as long which in theory would necessitate a transfer time twice as long. In other words, the presence of the intermediate point enables the rate of working to be doubled. In addition, more than one intermediate point may be used.

It should also be noted that the intermediate point also serves as a cooling point for the articles as they leave the mold. For accelerated cooling, cooling air may be blown in through openings 511 arranged in the plate 510.

Of course the assembly of the two gripping systems 400 has its working synchronised with that of the plate 210 and of the chain 100. Electromechanical means (position detector, contact, relay, etc.) could be applied without difficulty by the skilled man.

Figure 4:
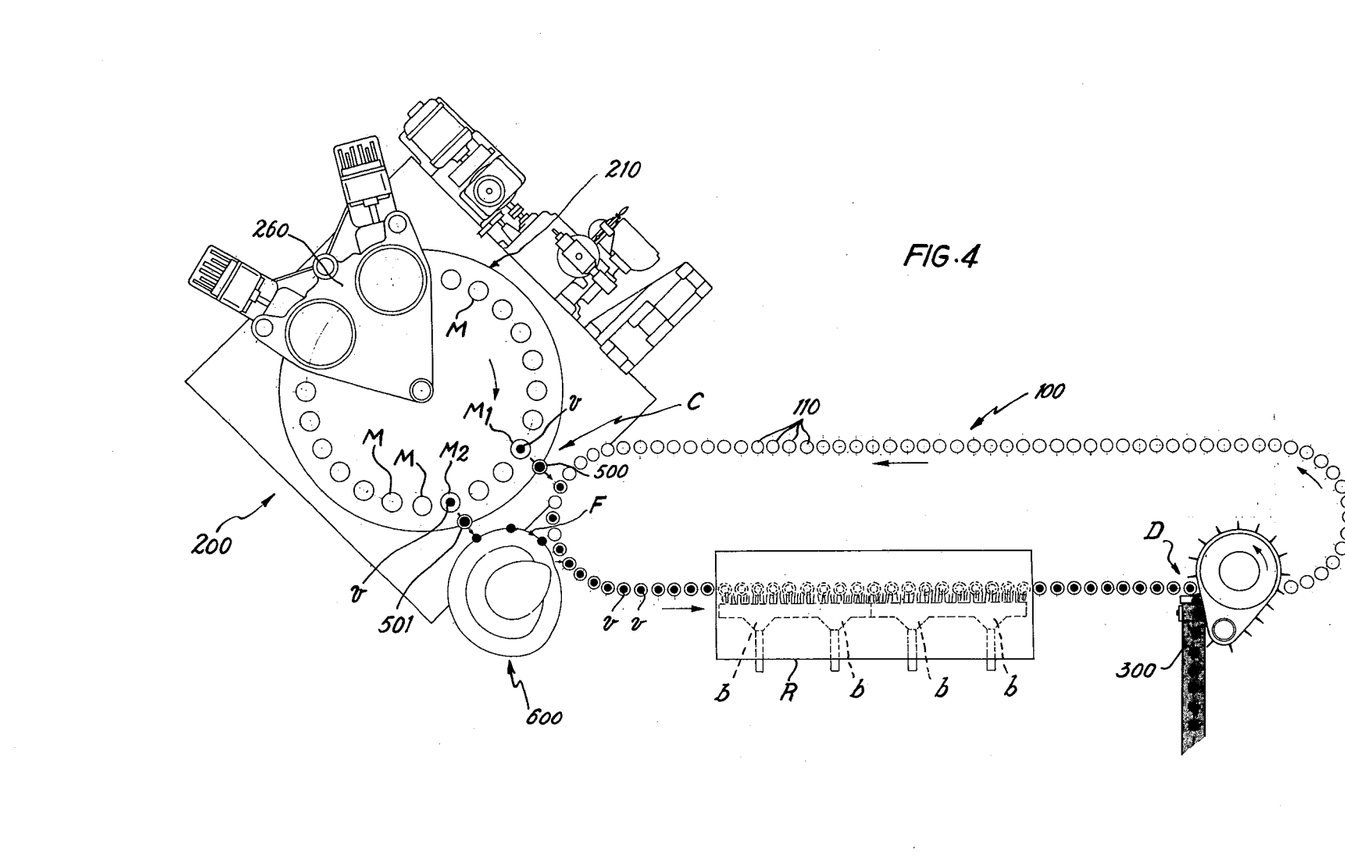
FIG. 4 represents a plan view of another embodiment of a flame treatment installation according to the invention.

FIG. 4 shows a variant of the installation of FIG. 1. The elements whose functions remain unchanged from FIG. 4 to FIG. 1 have been designated by the same reference numerals. The special characteristic of the installation of FIG. 4 resides essentially in the fact that it is supplied from a "double gob" press in which two molds arranged on the rotating plate 210 are charged simultaneously with molten glass. In the installation according to FIG. 4, the rotating plate 210 comprises 24 molds M regularly spaced around the periphery of the plate. The charging device 260 lets out not one of but two gobs of molten glass into two molds angularly spaced by 3/24 of a revolution. Of course, two molds are charged at the same time and from one molten glass charging phase to the next, the plate turns by a fraction of a revolution selected so that all the molds are filled successively without repetition (the angular variation being for example 2/24 of a revolution).

Moreover, to ensure the uniformity of manufacture, it is essential that two articles v formed at the same time should pass to the flame treatment ramp R with a substantially equal "age".

The problem therefore is to transfer substantially simultaneously to the turntable chain the two glass articles v manufactured in the same molding phase.

To do this, according to the invention, two devices are used to supply the chain 110 with articles v, from two mold positions M1 and M2 separated by an angular distance of 3/24 corresponding to the angular distance between two simultaneously filled molds.

As regards the mold position M1, the device used comprises a transfer point 500 and two gripping systems, of the type described in connection with FIGS. 2 and 3.

It will be noticed that the molding assembly 200 has been generally displaced and is no longer in the longitudinal axis of symmetry of the path of the chain 100. In this way, the mold position M1 is very close to the chain 100, whereas the mold position M2 is relatively distant from the chain.

It remains to transfer to the chain 100 the articles v coming fom the mold position M2.

To do this, an intermediate point 501 and a transfer swivel 600 are used. The articles v are transferred from the mold position M2 to the swivel 600 passing through the intermediate point 501 by means of an assembly of two gripping systems 400 of the type described in FIGS. 2 and 3. Each article, after being placed on the rotating swivel, is taken away and moved according to the path referenced F, to be placed finally on the turntable 110 of the chain 100 which immediately follows the turntable which has received the article v from the mold position M1 which was formed at the same time.

Thus the turntable chain 100 is entirely filled with articles, the two articles formed at the same time following one another on two adjacent turntables of the chain.

Figure 5:
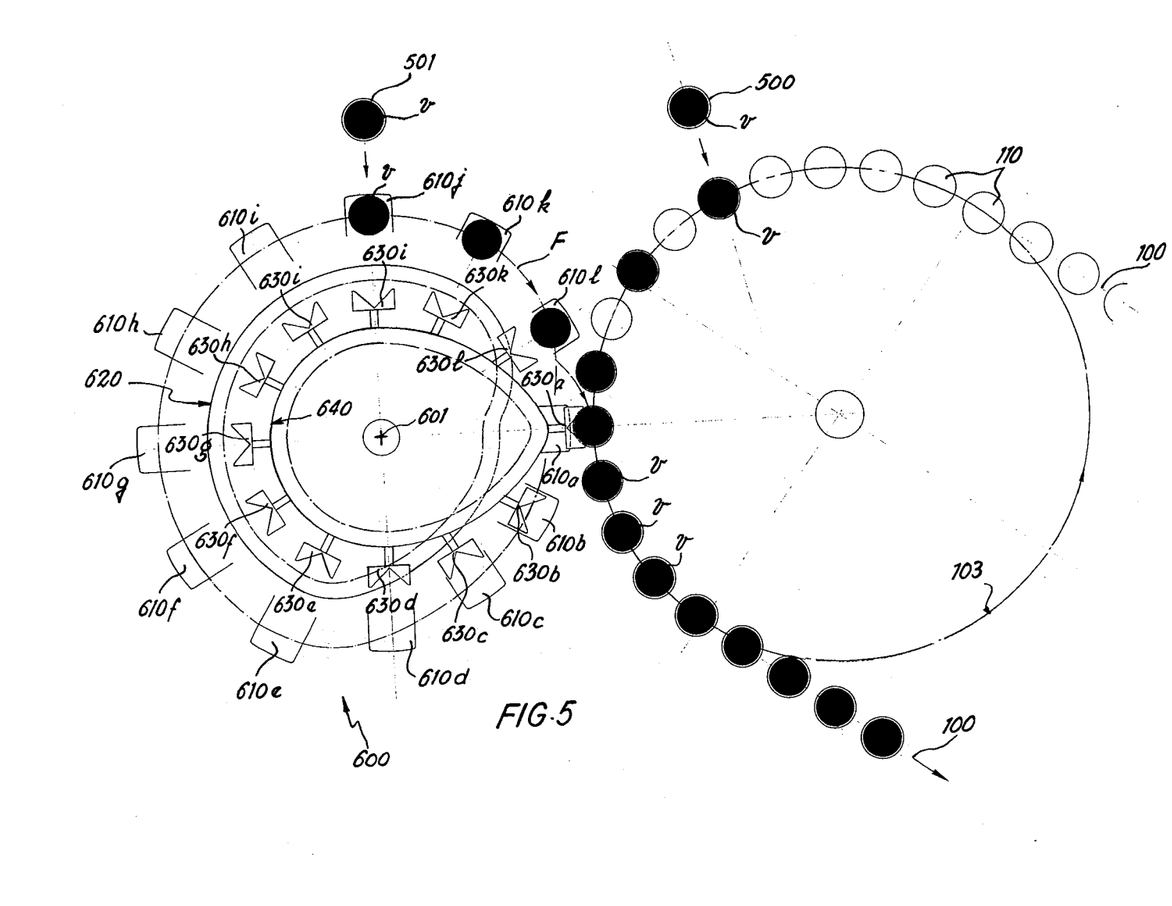
FIG. 5 represents a plan view on an enlarged scale of a detail (swivel) of FIG. 4.

FIG. 5 illustrates schematically the structure of the swivel 600 and of the transfer of the articles from the swivel 600 to the chain 100.

The swivel 600 comprises an assembly rotating about an axis 601, being synchronised with the chain 100 in a manner which will be described in more detail subsequently. In essence, the assembly 600 comprises in the same horizontal plane at right angles to the axis 601, twelve blades 610a, 610b, 610c, . . . 610l, regularly spaced about the axis 601. The blades 610 are in the form of flat elements radiating about the axis 601. Elastic means (return springs for example) tend always to bring them as close as possible to the axis 601 into a retracted position, whereas their radial travel enables them to reach an extreme position further away from the axis 601. It can be seen from the figure that the blades 610e to 610k are in their extreme position, the blades 610a and 610b are in the retracted position, and the blades 610c and 610d are in intermediate positions. The radial position of the various blades 610 is controlled by a fixed cam 620 of which the profile is such that when the blade assembly 610 rotates, it pushes them into the extreme position when the blades are distant from the chain 100 and lets them return to the retracted position when they approach the chain.

In a horizontal plane slightly above that of the blades 610 there is arranged above them a series of radial ejectors 630a to 630l. Like the blades, the ejectors 630 are radially displaceable, always tending to be returned by elastic means into a retracted radial position. The travel of the ejectors 630 is controlled by a fixed cam 640, so that when the swivel 600 moves, the ejectors 630 occupy an extreme radial position when they pass near the chain. It will therefore be understood that overall an article v1 coming from the intermediate point 501 can be placed by a gripping device 400 on a blade in the extreme position (610j). In the movement of the swivel assembly 600, the blade catches the article v when its passes into its subsequent positions (610k, 610l, 610a, . . . ). When it nears the position 610a, the blade retracts, while the corresponding ejector takes up its position of maximum radial elongation. In this movement, the article v is pushed onto the turntable 110a which is closest to the swivel 600, under the double effect of the movement of the ejector and the backwards movement of the blade supporting it.

In this way the articles are transferred smoothly from the swivel to the chain and in conditions which place onto two successive turntables of the chain the article coming from the point M1 and the article from the point M2, by virtue of a strict synchronisation of the swivel and the chain.

Figure 6:
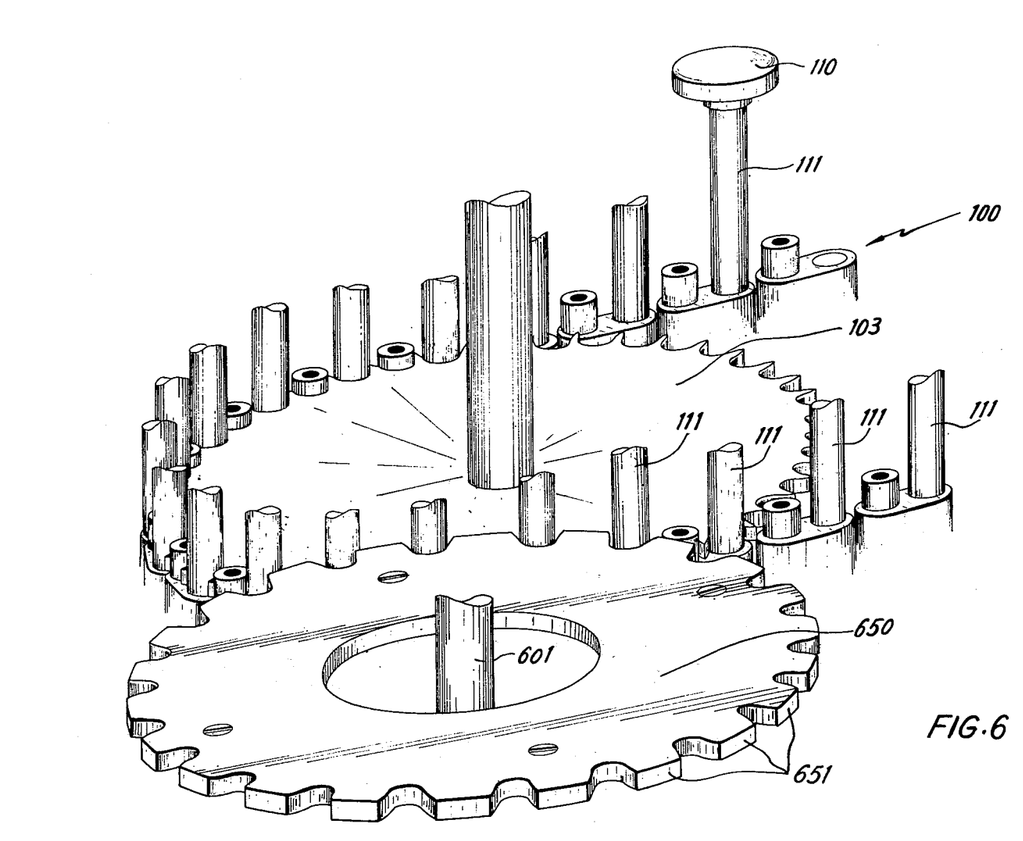
FIG. 6 shows a mechanical drive means used to drive the swivel of FIG. 5.

Preferably, as shown in FIG. 6, this synchronisation is ensured in the following manner: the swivel assembly 600 is driven by a crown gear 650 of which the teeth 651 engage between the successive stems 111 of the turntables 110 of the chain 100. The other elements of the turntables 600 are made integral parts of the crown gear 650 while in addition being mounted so as to rotate about the fixed axis 601 with which the crown gear 650 is concentric.

Figure 7:
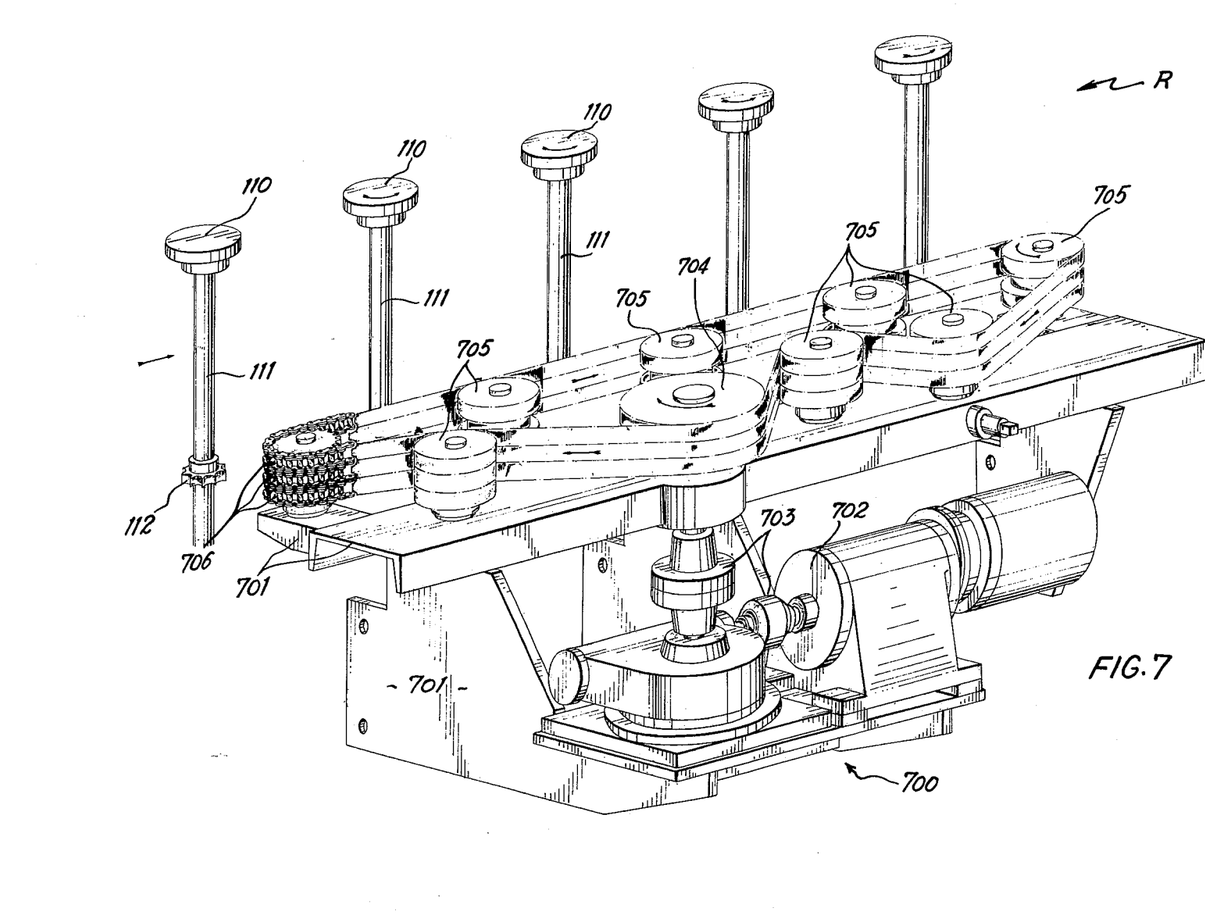
FIG. 7 shows the means used to vary the speed of rotation of the swivel in the flame treatment zone of an installation according to the invention.

FIG. 7 shows a system which may be used for the variation of the angular speed of the turntables which is used in the flame treatment zone R (FIG. 1 or FIG. 4). In addition such an installation can be used in the flame treatment zone of any linear flame treatment installation in which the turntables 110 are mounted on shafts 111 forming an integral part of a chain 100, the shafts or stems 111 being free to rotate relative to the chain assembly.

As has been seen, it is necessary in a flame treatment zone that the turntables 110 should turn on their own axes. According to the invention, to permit optimum flame treatment, regardless of the size of the article, the speed of rotation of the turntables must be variable.

To do this, the shafts of the turntables 110 are provided with toothed pinions 112 fixedly mounted thereon. A drive unit 700 comprising chassis elements 701, a motor 702, mechanical transmission elements 703, a driving gear wheel 704, free gear wheels 705 and mechanical sprocket chains 706, working together according to a closed circuit with the driving wheel 704, enables the shafts 111 and the turntables 110 to be rotated when the pinions 112, driven by the movement of chain 100 engage the mechanical chains 706.

Once this engaging has taken place, the speed of rotation of the turntables is proportional to the difference between the linear speed of the chain 100 and the linear speed of the chains 706.

According to the invention, the motor 702 which, through the transmission elements 703, drives the driving gear wheel 704 and the chains 705, is selected with variable speeds so as to be able to vary according to the diameter of the articles v being treated, the speed of rotation of the turntables 110.

Finally, the invention relates to a means to provide the turntables 110 of the chain 100 (or of any other chain for flame treatment or simply for the transfer of articles) with a predetermined orientation.

In particular, it may be important in an installation of the type of FIG. 1 or FIG. 4 to impart to the turntables a predetermined orientation immediately upstream of the loading point, then again immediately upstream of the unloading point. In this way, when the articles are not completely symmetrical, for example in the case of tumblers or mugs with a handle, they are placed on the turntables with a determined initial orientation, and by controlling the orientation of the turntables at their points of loading and unloading, it is also possible to unload the articles with a predetermined orientation.

Figure 8:
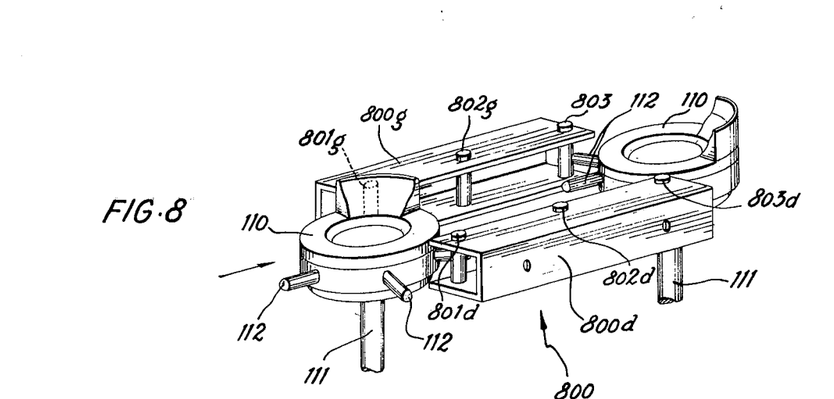
FIG. 8 shows a perspective view of a device for the regulation of the orientation of the turntables.

FIG. 8 shows in perspective a device for imparting a predetermined orientation to the turntables of a moving chain.

Figure 9:
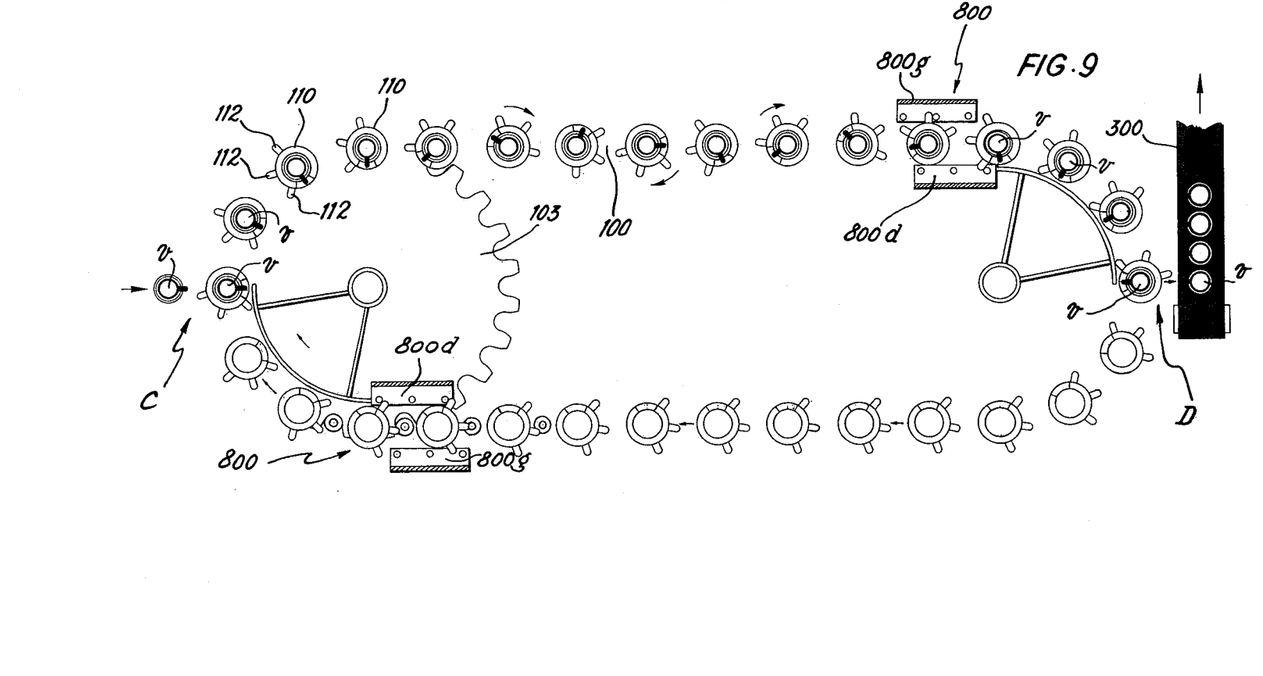
FIG. 9 shows an installation for transporting articles which uses the device according to FIG. 8.

FIG. 9 shows the use of this device in a closed circuit transfer installation.

According to the invention the circular turntables 110 mounted on an axis or shaft 111 which is free to rotate, are provided with three identical radial fingers 112 spaced at angular intervals of approximately 60°.

If $r$ is the radical length of each of these arms (from the axis 111 to the end of the arm), the two most extreme arms 112, at 120° from one another, together define a minimum width for the passage of the turntables $m = r\sqrt{3}$.

Two U-sections, right and left, 800d and 800g respectively, are placed opposite one another, each being provided with two sets of parallel stop-bars 801d, 802d, 803d; 801g, 802g, 803g respectively. The two sets of stop-bars are at a distance $m$ from each other. In each set, the adjacent stop-bars are separated by a distance the value of which is $r\pi/3$. Finally, the two sets of opposite stop-bars are arranged staggered in relation to one another.

With such an arrangement;
at least one of the fingers 112 must necessarily come into contact with one of the two initial stop-bars 801d or 801g;
this contact brings about the rotation of the turntable and this movement may be continued in the event of the other fingers 112 coming into contact with the stop-bars of the same set.

Finally, as can be seen from FIG. 9, each turntable, having passed through an orientation device 800, is oriented with its three fingers 112 turned symmetrically to the rear in the manner of fins.

FIG. 9 shows an installation in which turntables circulate between a loading point C and unloading point D. The articles v comprise a handle and they arrive at C with a predetermined orientation of their handle. It is desired to take them from C to D without losing control of the orientation of the articles. To do this, upstream of the loading point C there is located a first installation 800 for the orientation of the turntables. Another installation 800 is located slightly upstream of the point D, whereby the turntables are oriented when an article v is loaded onto them, and are reoriented when this article is unloaded. It is evident that at the exit from the heat treatment installation, the desired orientation is obtained regardless of variations during transfer onto the heat treatment installation.

Of course, the invention is not limited to the embodiments described above but extends to any variant which accords with the spirit of the invention. In particular, the press for the manufacture of the articles is not necessarily of the rotating plate type: it is also possible to use presses of the linear type in which the molded articles move linearly.

I claim:

1. An installation for the flame treatment of articles, comprising a chain, a supply means, a loading point and an unloading point, a flame treatment zone comprising a series of burners, and a plurality of rotatable turntables driven linearly and cyclically by said chain between said loading point, at which said articles are loaded onto said turntables by said supply means, and said unloading point, passing through said flame treatment zone; wherein said supply means comprises a molding press, at least one intermediate point, and transfer means for transferring one of said articles from said intermediate point to one of said turntables while the following article is transferred from said press to said intermediate point.

2. An installation according to claim 1, wherein said press comprises a rotating plate, the movement of which is synchronised with that of said chain.

3. An installation according to claim 2, wherein said supply means comprises a double gripping assembly which is radially movable in relation to said plate.

4. An installation according to claim 1, wherein said intermediate point comprises a horizontal support at the same level as said turntables.

5. An installation according to claim 4, wherein said support comprises means defining holes for blowing cooling air onto the articles.

6. An installation according to claim 2, wherein said molding press is a "double gob" press, the articles being formed in pairs on said plate and the transfer means is divided so that a pair of articles formed simultaneously on said plate are in adjacent positions on the chain.

7. An installation according to claim 6, further comprising a rotatable swivel synchronised with said chain, wherein said intermediate point is fixed and said transfer means comprises a double gripping assembly working in conjunction with said intermediate point to transfer an article from said plate to said chain a double gripping assembly working in conjunction with said intermediate point to transfer articles from said plate to said swivel which comprises means for receiving and transferring the articles.

8. An installation according to claim 7, wherein said receiving and transferring means comprises a group of blades and a group of ejectors regularly spaced around the periphery of the swivel and a fixed cam, each group being controlled by said fixed cam.

9. An installation according to claim 7, further comprising a crown gear linked to said swivel and engaging said chain to provide the synchronisation of said swivel and said chain.

10. An installation for the flame treatment of glass articles, comprising a chain, a supply means, a loading point and an unloading point, a flame treatment zone comprising a series of burners, and a plurality of rotatable turntables driven linearly and cyclically by said chain between said loading point, at which said articles are loaded onto said turntables by said supply means, and said unloading point, passing through said flame treatment zone; at least one toothed pinion associated with each of said turntables, at least one mechanical chain circulating parallel to the turntable chain in the flame treatment zone, engaging with said toothed pinions, means to vary the speed of the said mechanical chain in such a way that it is possible to regulate the speed of rotation of said turntables in said flame treatment zone.

* * * * *